2,879,266
Patented Mar. 24, 1959

2,879,266
WATER-INSOLUBLE DISAZO COMPOUNDS

Norman L. Anderson, Hamburg, N.Y., assignor to Allied Chemical Corporation, New York, N.Y., a corporation of New York No Drawing. Application November 8, 1955
Serial No. 545,793

10 Claims. (Cl. 260—152)

This invention relates to organic pigments and dyestuffs. It relates more particularly to water-insoluble disazo compounds having a combination of properties which render them particularly useful for the coloring of resinous compositions and especially thermoplastic and thermosetting artificial resinous compositions.

The compounds of the present invention are disazo-dibenzothiophene-dioxides free from water-solubilizing substituents (substituents imparting water-solubility to the molecule, e.g., sulfo, sulfato, phosphato, and carboxyl radicals in the free acid and salt forms) and having a dibenzothiophene-dioxide radical linked, through an azo group in each of the 3- and 7-positions, to coupling components selected from the group consisting of acylacet-arylides and 1-aryl-5-pyrazolones.

They include compounds in which the dibenzothiophene-dioxide radical is free from substituents other than said azo substituents and compounds in which one or more of the hydrogen atoms of the dibenzothiophene-dioxide nucleus are replaced by an alkyl radical, and especially one containing up to 2 carbon atoms (e.g., methyl and ethyl). The acylacet-arylide coupling components include various arylamides of various acylacetic acids, such as, amides of mononuclear and polynuclear aromatic amines (e.g., aniline, the various toluidines and xylidines, the various anisidines, benzidine, the various mono- and di-chlor anilines, toluidines and anisidines) with acetoacetic acid and benzoylacetic acid, all of which are free from substituents imparting water-solubility to the molecule. The pyrazolone coupling components include various 1-aryl-5-pyrazolones free from substituents imparting water solubility, in which the 1-aryl radical is mononuclear or polynuclear, and more particularly those in which the pyrazolone nucleus is substituted in the 3-position by an alkyl group, and especially a lower alkyl group, or the radical of an ester of a carboxylic acid, and especially a carbalkoxy radical having 1 to 5 carbon atoms in the alkoxy group (such as, carbomethoxy, carbethoxy and carbopropoxy).

Those which are derived from anilides (mononuclear aromatic amides) of acetoacetic acid are of particular value, in view of their outstanding fastness to light and resistance to bleeding when materials colored therewith are exposed to organic solvents such as ethanol, acetone, benzene, toluene and xylene, and lack of migration to the surface of plastics and resins colored therewith, by the action of plasticizers normally employed for such materials.

The compounds of the present invention are represented by the formula

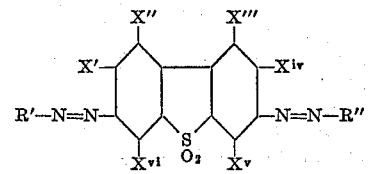

wherein

R' and R" are the same or different radicals selected from the group consisting of acylacet-arylides and 1-aryl-5-pyrazolones, which are free from substituents imparting water solubility to the molecule; and $X'$, $X''$, $X'''$, $X^{iv}$, $X^v$ and $X^{vi}$ are selected from the group consisting of hydrogen and lower akyl.

I have discovered that compounds of the above type possess a combination of desirable properties which render them especially useful as coloring agents for resinous compositions and especially thermoplastic and thermosetting artificial resinous compositions. Thus they are water-insoluble, colored compounds which are very sparingly soluble in the usual organic solvents, such as ethyl alcohol, acetone, benzene, toluene, and xylene. They are readily miscible with such thermoplastic and thermosetting resinous compositions as synthetic resins of the phenol-formaldehyde, polyvinyl, polyethylene, and styrene types, to which they impart shades varying from red, orange and yellow to brown and violet which are very fast to light and highly resistant to bleeding.

The compounds of the present invention are also valuable dyestuffs for artificial textile materials, such as cellulose acetate, other esters of cellulose, cellulose ethers, polyamide fibers of the nylon type, acrylic fibers (e.g., "Orlon," "Dynel," and "Acrilan"), terephthalate polyesters (e.g., "Dacron"), and the like, to which they may be applied in ways well known in the art; for example, in the form of finely dispersed aqueous suspensions, or as pigments for spin-dyeing. They may also be used, as such, as pigment colors in paints, lacquers, printing inks, and other coating compositions, as well as in formed plastics.

The compounds of the present invention can be prepared by coupling substantially one molecular proportion of a tetrazotized 3,7-diamino-dibenzothiophene-dioxide, or of a mixture of two or more of such tetrazotized diamines, with at least two molecular proportions of an acylacet-arylide or a 1-aryl-5-pyrazolone, or with two molecular proportions of a mixture of two or more individual acylacet-arylides or 1-aryl-5-pyrazolones, all of which are free from water-solubilizing substituents. Mixed products resulting from the use of mixtures of tetrazo and/or coupling components have unusual properties which, by virtue of the intimate physical commingling as well as the permuted chemical constitution of the mixed products, are not readily obtainable by mechanically admixing individual compounds.

The coupling is preferably effected in an aqueous reaction mixture which is maintained weakly acid; but it can also be carried out in suitable hydrophilic organic liquid media (such as, methyl and ethyl alcohols), and if desired, it can be effected in a reaction mixture which is substantially maintained at another acid condition, or neutral or at a uniform alkaline condition, or which varies over the range from acidity to alkalinity.

Representative compounds of the present invention are the products of the coupling of the following diaminodibenzothiophene-dioxides:

3,7-diamino-dibenzothiophene-dioxide
2,8-dimethyl-3,7-diamino-dibenzothiophene-dioxide with the following acylacet-arylides and 1-aryl-5-pyrazolones:

Acetoacet-anilide
Acetoacet-toluide (ortho, meta and para)
Acetoacet-aniside (ortho, meta and para)
Diacetoacet-benzidide
Acetoacet-chloranilide (ortho, meta and para)
Acetoacet-dichloranilide
Acetoacet-meta-xylide
1-phenyl-3-methyl-5-pyrazolone
1-ortho-tolyl-3-methyl-5-pyrazolone
1-para-tolyl-3-methyl-5-pyrazolone
1-ortho-chlorophenyl-3-methyl-5-pyrazolone
1-meta-chlorophenyl-3-methyl-5-pyrazolone
1-phenyl-3-carbethoxy-5-pyrazolone
1-para-chlorophenyl-3-carbethoxy-5-pyrazolone The invention will be illustrated by the following specific examples, but it is to be understood that the invention is not limited to their details and that changes may be made without departing from its scope. The temperatures are in degrees centigrade and the parts are by weight unless designated as parts by volume. Where parts are by volume, the amount signifies the volume occupied by the same number of parts by weight of water at 4° C.

EXAMPLE 1

Solution A

A well stirred mixture of 12.3 parts of 3,7-diaminodibenzothiophenedioxide in 200 parts of water and 32.5 parts of 20° Bé. hydrochloric acid was cooled to 0° by addition of 150 parts of ice and thereafter a solution of 7.2 parts of sodium nitrite in 30 parts of water was added slowly. The aqueous mass was agitated for about two hours at 0° to 5° to effect substantially complete conversion of the diamino compound to the corresponding tetrazonium hydrochloride form.

Solution B

Meanwhile, 22 parts of acetoacet-ortho-chloranilide were dissolved in 130 parts of 3% aqueous sodium hydroxide. The solution was diluted and cooled, by addition of ice and water, to a volume of 500 parts at 5°. To this solution, dilute (about 10%) acetic acid was added until the pH of the mixture was slightly acid to nitrazine yellow (the amount required containing about 3.2 parts acetic acid), and then 20 parts of anhydrous sodium acetate were added.

Solution A was added to agitated Solution B over a period of about one hour and a half. The mixture was stirred for about half an hour to complete the coupling, and the slurry of water-insoluble dyestuff thus formed was heated to the boiling point and filtered hot. The filter-cake of product was washed with 1500 parts of warm water, air-dried at about 60°, and ground to a powder.

The resulting dyestuff which is represented by the formula

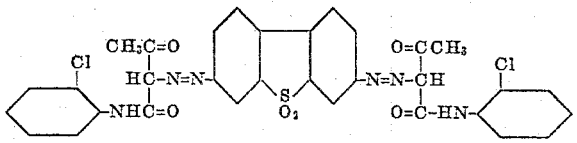

was a bright greenish-yellow solid, insoluble in water, ethyl alcohol, benzene, toluene and xylene, and very sparingly soluble in formamide, dioxane and acetone. It can be readily incorporated as a coloring agent with various synthetic resinous and plastic compositions, such as those of the phenol-formaldehyde, polyvinyl, polyethylene, and styrene types, to which it imparts a bright greenish-yellow color which is very fast to light and very resistant to bleeding.

EXAMPLE 2

In a manner similar to that described in Example 1, 12.3 parts (one mol equivalent) of 3,7-diamino-dibenzothiophene-dioxide was tetrazotized and coupled with 23.2 parts (2 mol equivalents) of 1-phenyl-3-carbethoxy-5-pyrazolone. The final product, which is represented by the formula

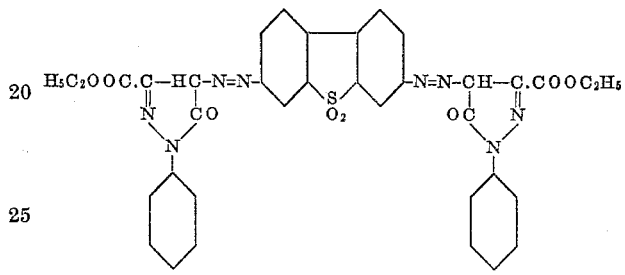

was a water insoluble red solid, very sparingly soluble in ethyl alcohol, benzene, toluene, and xylene. The dye-stuff is readily miscible with various synthetic resinous and plastic compositions, such as those of the phenol-formaldehyde, polyvinyl, polyethylene, and styrene types, to which it imparts a red shade which is very fast to light and very resistant to bleeding.

EXAMPLES 3 TO 14

Additional dyestuffs set out in the following table, having similar light-fastness and resistance to bleeding, were produced by tetrazotizing the diamines set out in the table and coupling with substantially 2 mols of the coupling components set out in the table, in the manner described in Example 1. When incorporated as coloring agents into phenol-formaldehyde and polyvinyl plastic compositions, they imparted to them the colors set out in the table.

TABLE

| Example | Diamine | Coupling Component | Color Imparted to Plastics |
|---|---|---|---|
| 3 | 3,7-Diamino-dibenzothiophene-dioxide. | Acetoacet-2,5-dimethoxyanilide. | Yellow. |
| 4 | ----do---- | Acetoacet-o-toluide. | Greenish Yellow. |
| 5 | ----do---- | Acetoacet-m-xylide. | Yellow. |
| 6 | ----do---- | 1-(o-chlorophenyl)3-methyl-5-pyrazolone. | Orange. |
| 7 | ----do---- | 1-(m-chlorophenyl)-3-methyl-5-pyrazolone. | Reddish Orange. |
| 8 | ----do---- | 1-(p-chlorophenyl)-3-methyl-5-pyrazolone. | Orange. |
| 9 | ----do---- | 1-(2,5-dichlorophenyl)-3-methyl-5-pyrazolone. | Reddish Orange. |
| 10 | 3,7-Diamino-2,8-dimethyl-dibenzothiophene-dioxide. | Acetoacet-o-chloranilide. | Yellow. |
| 11 | ----do---- | Acetoacet-o-toluide. | Reddish Yellow. |
| 12 | ----do---- | Acetoacet-m-xylide. | Do. |
| 13 | ----do---- | 1-Phenyl-3-carbethoxy-5-pyrazolone. | Yellowish Red. |
| 14 | ----do---- | 1-(p-chlorophenyl)-3-methyl-5-pyrazolone. | Reddish Yellow. |

I claim:

1. A disazobenzothiophene-dioxide free from water-solubilizing substituents and having a dibenzothiophene-dioxide radical selected from the group consisting of dibenzothiophene and its lower alkyl substituted derivatives linked, through an azo group in each of the 3- and 7-positions, to coupling components selected from the group consisting of acetoacet-arylides, benzoylacet-arylides and 1-aryl-5-pyrazolones.

2. A disazo-dibenzothiophene-dioxide free from water-solubilizing substituents and having the dibenzothiophene-dioxide radical linked through an azo group in each of the 3- and 7-positions to arylides of acetoacetic acid.

3. A symmetrical disazo-dibenzothiophene-dioxide free from water-solubilizing substituents and having the dibenzothiophene-dioxide radical linked through an azo group in each of the 3- and 7-positions to an anilide of acetoacetic acid.

4. A disazo-dibenzothiophene-dioxide having the formula

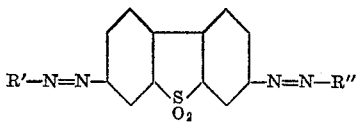

wherein each of R' and R" is an anilide of acetoacetic acid.

5. A disazo-dibenzothiophene-dioxide having the formula

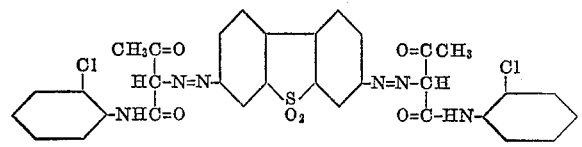

being a bright greenish-yellow solid, insoluble in water, ethyl alcohol, benzene, toluene and xylene, and very fast to light.

6. A disazo-dibenzothiophene-dioxide free from water-solubilizing substituents and having the dibenzothiophene-dioxide radical linked through an azo group in each of the 3- and 7-positions to 1-aryl-5-pyrazolones.

7. A disazo-dibenzothiophene-dioxide free from water-solubilizing substituents and having the dibenzothiophene-dioxide radical linked through an azo group in each of the 3- and 7-positions to 1-mononuclear-aryl-5-pyrazolones.

8. A symmetrical disazo-dibenzothiophene-dioxide free from water-solubilizing substituents and having the dibenzothiophene-dioxide radical linked through an azo group in each of the 3- and 7-positions to a 1-phenyl-5-pyrazolone.

9. A disazo-dibenzothiophene-dioxide free from water-solubilizing substituents and having the dibenzothiophene dioxide radical linked through an azo group in each of the 3- and 7-positions to a 1-phenyl-3-carbalkoxy-5-pyrazolone having 1 to 5 carbon atoms in the alkoxy group.

10. A disazo-dibenzothiophene-dioxide as defined in claim 9, in which each azo substituent is 4-azo-1-phenyl-3-carbethoxy-5-pyrazolone.

References Cited in the file of this patent
UNITED STATES PATENTS

| | | |
|---|---|---|
| 2,059,852 | Dahlen et al. | Nov. 3, 1936 |
| 2,537,098 | Slifkin et al. | Jan. 9, 1951 |
| 2,733,165 | Williams et al. | Jan. 31, 1956 |
| 2,752,333 | Lecher et al. | June 26, 1956 |